(12) United States Patent
Kassai et al.

(10) Patent No.: US 6,485,101 B2
(45) Date of Patent: Nov. 26, 2002

(54) CHILD SEAT WITH MOVABLE SIDE HEAD GUARDS

(75) Inventors: Kenzou Kassai, Osaki (JP); Hiroyasu Yamamoto, Osaka (JP)

(73) Assignee: Aprica Kassai Kabushikikaisha, Osaka (JP)

(*) Notice: Subject to any disclaimer, the term of this patent is extended or adjusted under 35 U.S.C. 154(b) by 0 days.

(21) Appl. No.: 09/919,310

(22) Filed: Jul. 31, 2001

(65) Prior Publication Data

US 2001/0043001 A1 Nov. 22, 2001

Related U.S. Application Data

(63) Continuation of application No. 09/238,265, filed on Jan. 27, 1999, now abandoned.

(30) Foreign Application Priority Data

| Jan. 27, 1998 | (JP) | 10-014347 |
| Sep. 11, 1998 | (JP) | 10-258070 |
| Dec. 25, 1998 | (JP) | 10-369997 |

(51) Int. Cl.$^7$ .................................................. A47C 1/08
(52) U.S. Cl. ............... 297/250.1; 297/410; 297/452.34; 297/284.9; 297/216.11; 297/256.15
(58) Field of Search .................... 297/250.1, 284.9, 297/410, 452.34, 452.35, 452.36, 216.11, 216.12, 256.15

(56) References Cited

U.S. PATENT DOCUMENTS

| 4,130,318 A | 12/1978 | Hemmen et al. |
| 4,205,877 A | 6/1980 | Ettridge |
| 4,274,674 A | 6/1981 | Deloustal |
| 4,402,548 A | 9/1983 | Mason |
| 4,762,364 A | 8/1988 | Young |
| 4,793,652 A | 12/1988 | Hannah et al. |
| 4,854,639 A | 8/1989 | Burleigh et al. |
| 4,936,629 A | 6/1990 | Young |

(List continued on next page.)

FOREIGN PATENT DOCUMENTS

| DE | 4137599 | 5/1993 |
| DE | 4341929 | 6/1995 |
| EP | 0009439 | 4/1980 |
| EP | 0426585 | 5/1991 |
| EP | 0545185 | 6/1993 |
| EP | 0589071 | 3/1994 |
| EP | 0853018 | 7/1996 |
| EP | 0751033 | 1/1997 |
| EP | 0853019 | 7/1998 |
| GB | 2256364 | 12/1992 |
| JP | 6243835 | 3/1987 |
| JP | 1113007 | 5/1989 |
| JP | 190654 | 6/1989 |
| JP | 7017312 | 1/1995 |
| JP | 10250426 | 9/1998 |
| WO | 91/00193 | 1/1991 |
| WO | WO94/04389 | 3/1994 |

OTHER PUBLICATIONS

Japanese Industrial Standard (JIS), Automotive accessories—Child restraints, JIS D 0401–1996.
J. Naito, "Childcare: Nurturing the Heart", Aprica Childcare Institute, English version of "Ikuji Gennri", Table of Contents.

*Primary Examiner*—Anthony D. Barfield
(74) *Attorney, Agent, or Firm*—W. F. Fasse; W. G. Fasse

(57) ABSTRACT

Nursing equipment for a child, such as an adjustable child safety seat, includes a back rest, a pair of side guards provided on opposing sides of the back rest for protecting side portions of an infant, and a pair of side head guards provided to be movable in an upward/downward direction and so as to be selectively detachable, inside the pair of side guards. By this structure, the nursing equipment helps to surely protect the head and particularly the brain of an infant as the infant grows.

18 Claims, 18 Drawing Sheets

U.S. PATENT DOCUMENTS

| | | |
|---|---|---|
| 4,998,307 A | 3/1991 | Cone |
| 5,064,245 A * | 11/1991 | Stephens ................ 297/397 X |
| 5,086,514 A | 2/1992 | Ross |
| 5,149,173 A | 9/1992 | Jay et al. |
| 5,183,312 A | 2/1993 | Nania |
| 5,444,881 A | 8/1995 | Landi et al. |
| 5,496,092 A | 3/1996 | Williams et al. |
| 5,675,853 A | 10/1997 | Linge |
| 5,681,084 A | 10/1997 | Yoneda |
| 5,722,729 A | 3/1998 | Carilli |
| 5,829,829 A | 11/1998 | Celetina-Krevh |

\* cited by examiner

CHILD SEAT WITH MOVABLE SIDE HEAD GUARDS

CROSS-REFERENCE TO RELATED APPLICATION

This application is a Continuation Application of U.S. patent application Ser. No. 09/238,265 now abandoned, filed Jan. 27, 1999 and is further related to copending U.S. patent application Ser. No. 09/004,699 (which issued as U.S. Pat. No. 6,196,629 on Mar. 6, 2001), of the same assignee as the present application.

BACKGROUND OF THE INVENTION

1. Field of the Invention

The present invention relates to a nursing equipment or an adjustable child safety support device such as an adjustable child safety seat and, more specifically, to a structure for a nursing equipment capable of fully protecting a head (brain) of an infant.

2. Description of the Background Art

Healthy and sound growth of infants and babies is a common wish of parents worldwide. The first to third years, and especially the second year for a baby is a critical period when the baby comes to be aware of his or her self. Therefore, it is recognized that protection of the head (brain) of the, infant of this age is of importance for sound and healthy growth of the infant.

The head (brain) may be protected by a "proper nursing method" and "use of proper nursing equipment." Here, "proper nursing method" means proper parental care of the infant as described in detail in, for example, *IKUJI NO GENRI* (Principle of Child Bearing), by Dr. Jushichiro Naito.

A vehicular child safety seat disclosed in Japanese Patent Application No. 9-289733 filed on Oct. 22, 1997 and laid-open on Sep. 22, 1998 under Japanese Patent Laying-Open No. 10-2550426, by the same applicant as the present application (which corresponds to U.S. patent application Ser. No. 09/004,699) proposed as "proper nursing equipment", includes a pair of side guards on opposing sides of a back rest. Inside the pair of side guards, a pair of side head guards are provided for protecting the head of an infant.

In the structure of the vehicular child safety seat disclosed in Japanese Patent Application No. 9-289733, though the position of the head of an infant changes as the infant grows, the side head guards are fixed inside the side guards. Therefore, the side head guards are not always at the optimal position for protecting the head (brain) of the infant.

SUMMARY OF THE INVENTION

An object of the present invention is to provide a proper nursing equipment for assisting healthy and sound growth of an infant and, more specifically, to provide a nursing equipment which can help to sufficiently protect the head (brain) of the infant against external shock, throughout the growth of the infant. The term "nursing equipment" is used herein refers to an adjustable child safety support device such as an adjustable child safety seat.

The above described objects of the present invention can be attained by the nursing equipment in accordance with one aspect of the present invention which includes a back rest supporting the infant from behind, a pair of side body guards provided on opposing sides of the back rest for protecting the sides of the infant, and a pair of side head guards adjustable in height in the upward/downward direction, provided inside the pair of side body guards for protecting the head of the infant. The side body guards will be termed side guards herein for brevity.

As the pair of side head guards are provided adjustable in height in the upward/downward direction, the pair of side head guards can be positioned optimally relative to the position of the head (brain) of the infant, as the infant grows. Accordingly, it is possible to help to sufficiently protect the head (brain) of the infant against external shock.

In the nursing equipment, the pair of side head guards are provided detachable from the nursing equipment. Further, the side head guards are provided slidable from an upper region to a lower region of the pair of side guards.

Preferably, the pair of side head guards are provided detachable from the pair of side guards. More preferably, the pair of side head guards are not detachable when they are positioned in the lower region of the pair of side guards, and are detachable when they are positioned in the upper region of the pair of side guards.

Because of this structure, it becomes possible to provide a nursing equipment which always fits the body of the infant, as he or she grows from an infant to a toddler, by appropriately removing the pair of side head guards from the nursing equipment in accordance with the growth of the infant.

Preferably, in the nursing equipment, the pair of side head guards have a shock absorbing structure. More preferably, the back rest has a shock absorbing structure at least at a position of the back rest where the head of the infant rests, for absorbing shock.

More preferably, the back rest further has a strip shaped member for coupling back sides of the pair of side guards and more preferably, the strip shaped member has a shock absorbing structure for absorbing the shock at least at that position of the member where the head of the infant rests.

By the above described structure in which respective members are provided with a shock absorbing structure, it becomes possible to cover the head of an infant from both sides and from the back side to fully protect the head. Therefore, the head (brain) of the infant can be substantially fully protected against external shock.

More preferably, the nursing equipment further has a safety belt including a shoulder belt for supporting the infant on the back rest, and the strip shaped member has a guide hole through which the shoulder belt of the safety belt is passed. Preferably, the guide hole includes a holding member for holding the shoulder belt.

By this structure, it becomes possible to adjust the position of the strip shaped member and to adjust the position of the shoulder belt of the safety belt, to be fit to the body of the infant.

The nursing equipment further includes an upper head guard at an upper position of the back rest, and the strip shaped member, the pair of side head guards and the upper head guard are provided integrally, movable in the upward/downward direction.

This structure facilitates adjustment of the nursing equipment in accordance with the sides of the body of the infant and to always ensure a comfortable space for the infant.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The nursing equipment in accordance with the embodiments of the present invention will be described with reference to the figures.

First Embodiment

Figure 1:
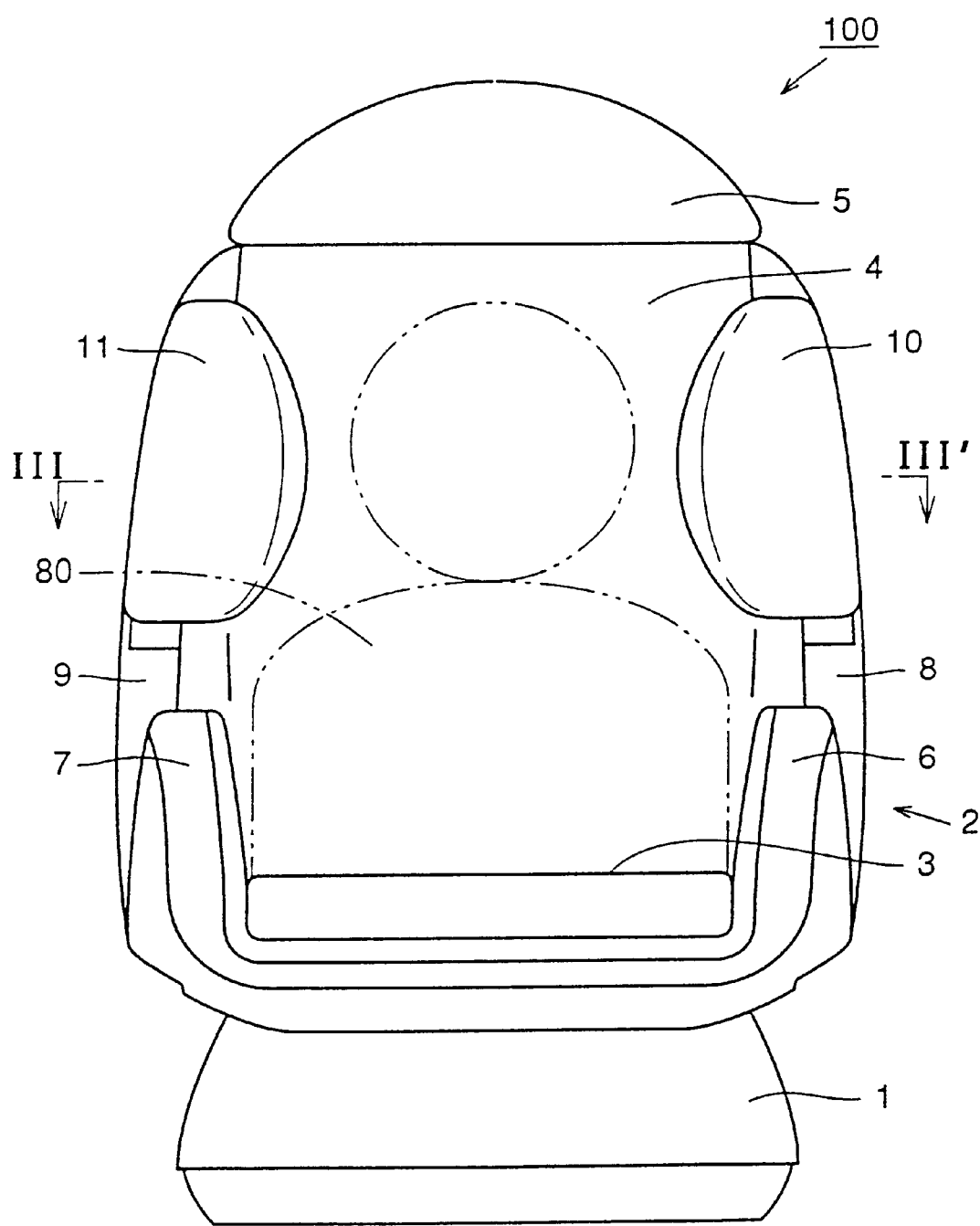
FIG. 1 is a front view showing a structure of a child seat in accordance with a first embodiment.
Figure 2:
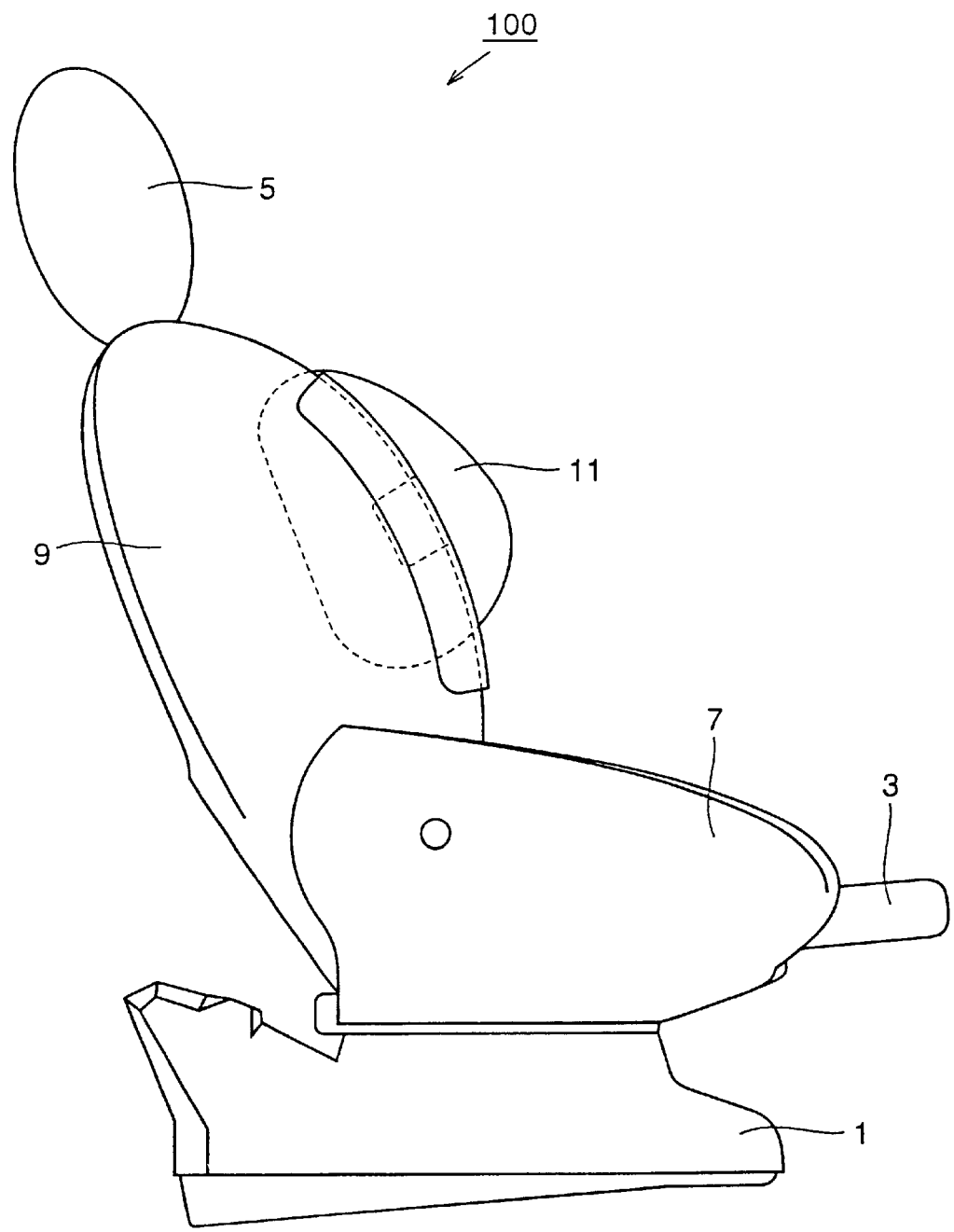
FIG. 2 is a side view showing a structure of the child seat in accordance with the first embodiment.
Figure 3:
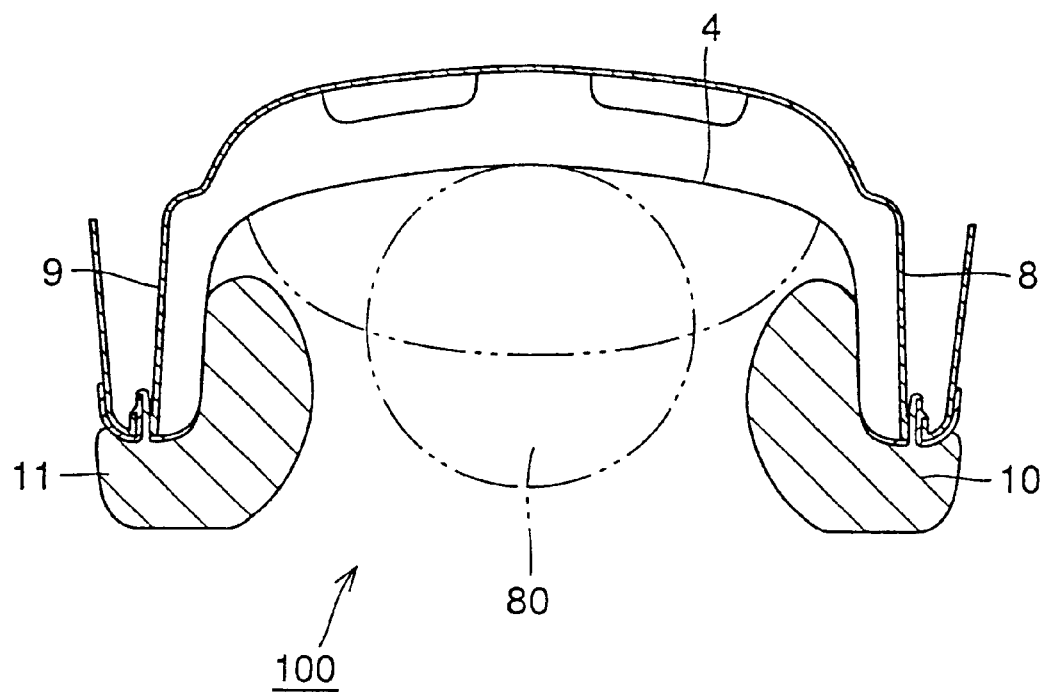
FIG. 3 is a cross sectional view taken along the line III–III' of FIG. 1.

First, referring to FIGS. 1 to 3, the structure of a vehicular child safety seat (hereinafter referred to as a child seat) as a nursing equipment will be described. FIG. 1 is a front view of child seat 100, FIG. 2 is a side view of child seat 100 and FIG. 3 is a cross section taken along the line III–III' of FIG. 1.

Child seat 100 includes a base 1 which is fixed by a safety belt (not shown) installed in a vehicle, and a seat apparatus 2 rotatably supported relative to base 1.

Seat apparatus 2 includes a seat portion 3 for supporting an infant 80, a back rest 4 coupled reclinable with respect to seat portion 3, and an upper head guard 5 for protecting the top of the head of infant 80, when the back rest 4 is fully reclined backward.

A pair of arm rests 6 and 7 are provided on opposing sides of seat 3, and a pair of side guards 8 and 9 are provided on opposing sides of back rest 4. Further, a pair of side head guards 10 and 11 for protecting the sides of the head of infant 80 are provided inside the pair of side guards 8 and 9.

The side head guards 10 and 11 in accordance with the present embodiment are provided along and movable between upper and lower regions of side guards 8 and 9. When side head guards 10 and 11 are slid upward relative to side guards 8 and 9, the shape of the child seat is as shown in FIGS. 4 and 5.

Figure 4:
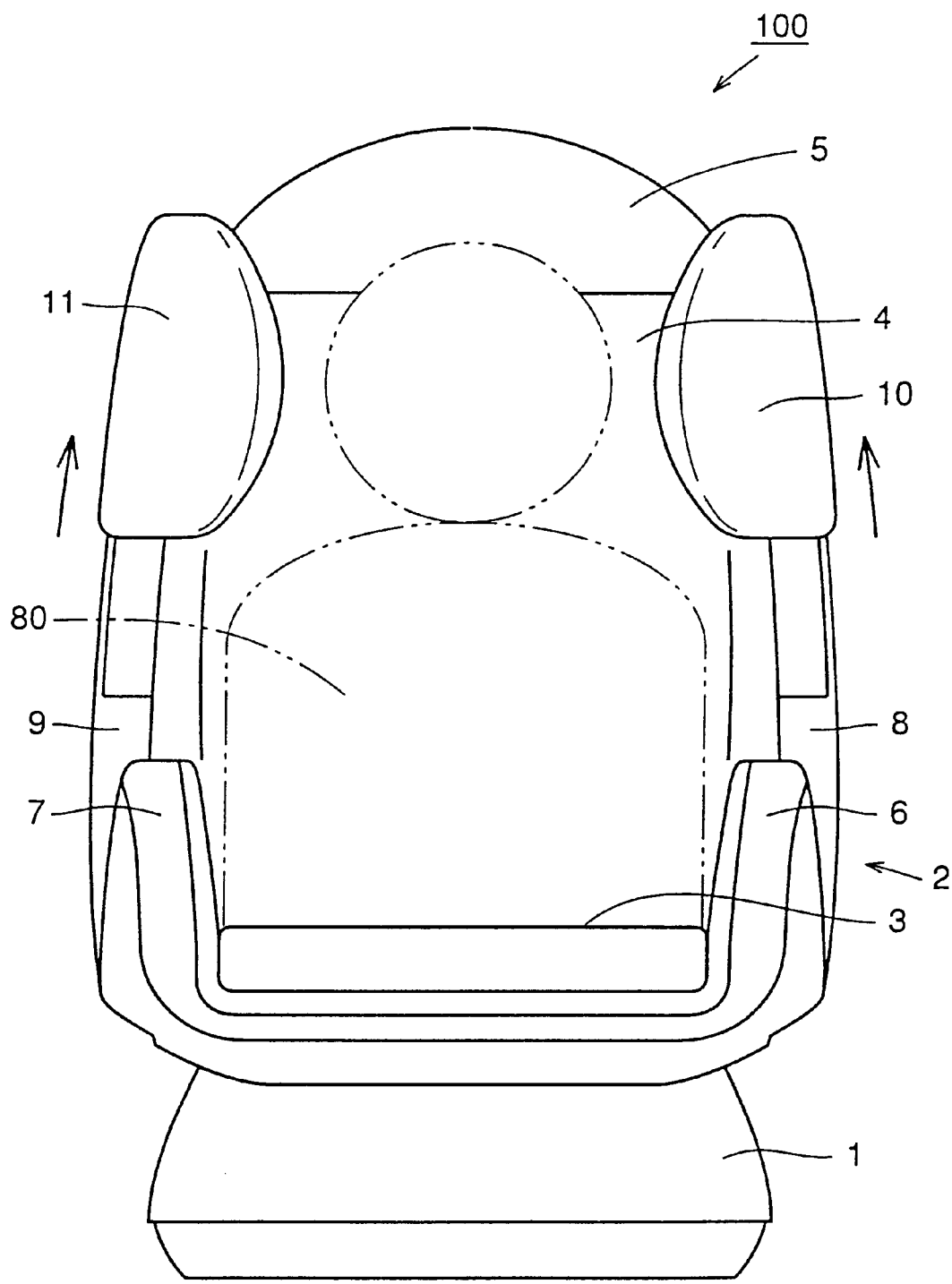
FIG. 4 is a front view showing the child seat of FIG. 1 with its shape changed.
Figure 5:
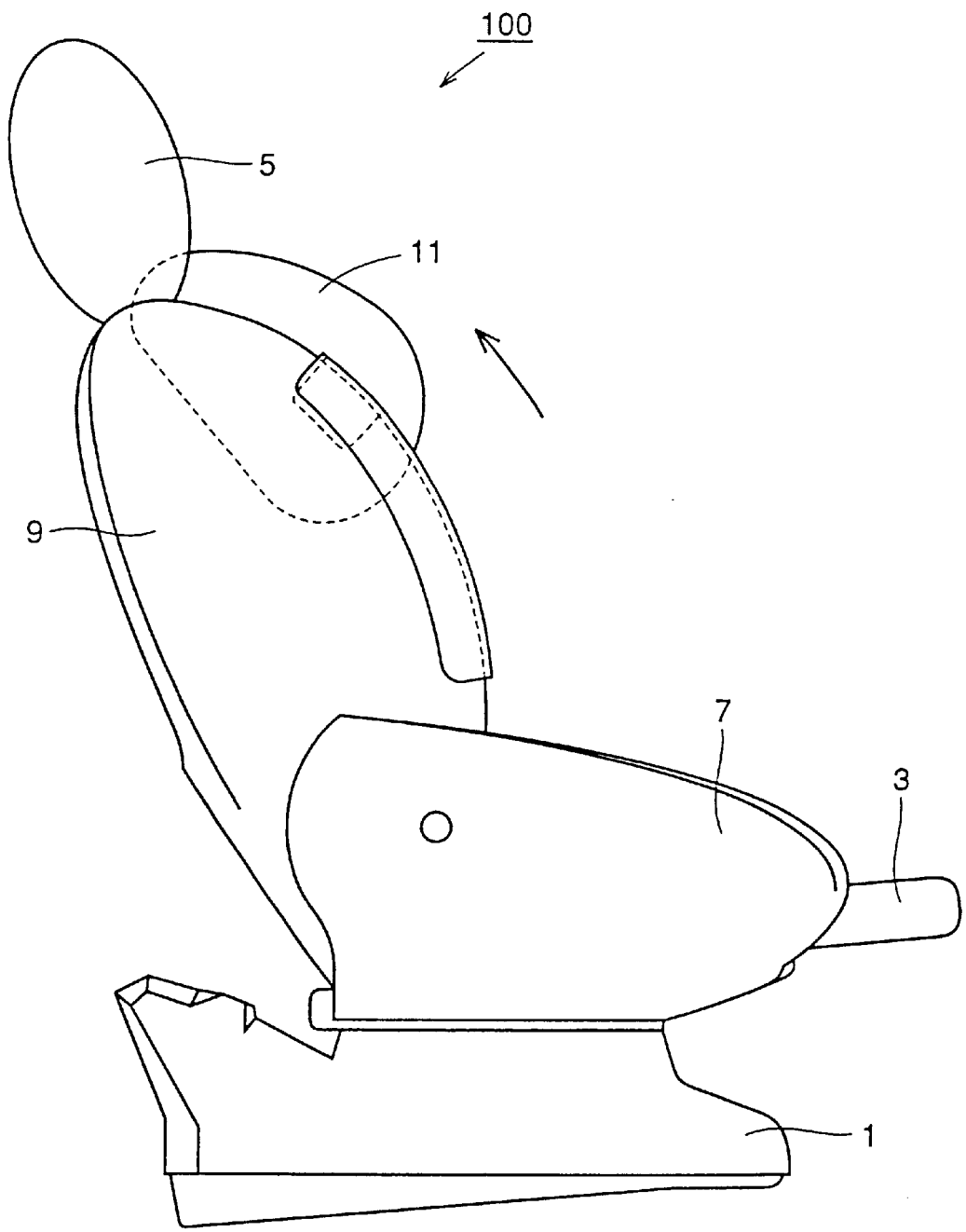
FIG. 5 is a side view of the child seat of FIG. 4.

FIG. 4 is a front view of child seat 100 when side head guards 10 and 11 are moved fully upward, and FIG. 5 is a side view of child seat 100 when side head guards 10 and 11 are fully slid upward.

Namely, side head guards 10 and 11 can be changed in position as the infant 80 grows, and hence it is possible to position side head guards 10 and 11 optimally for protecting the sides of the head of infant 80.

Figure 6:
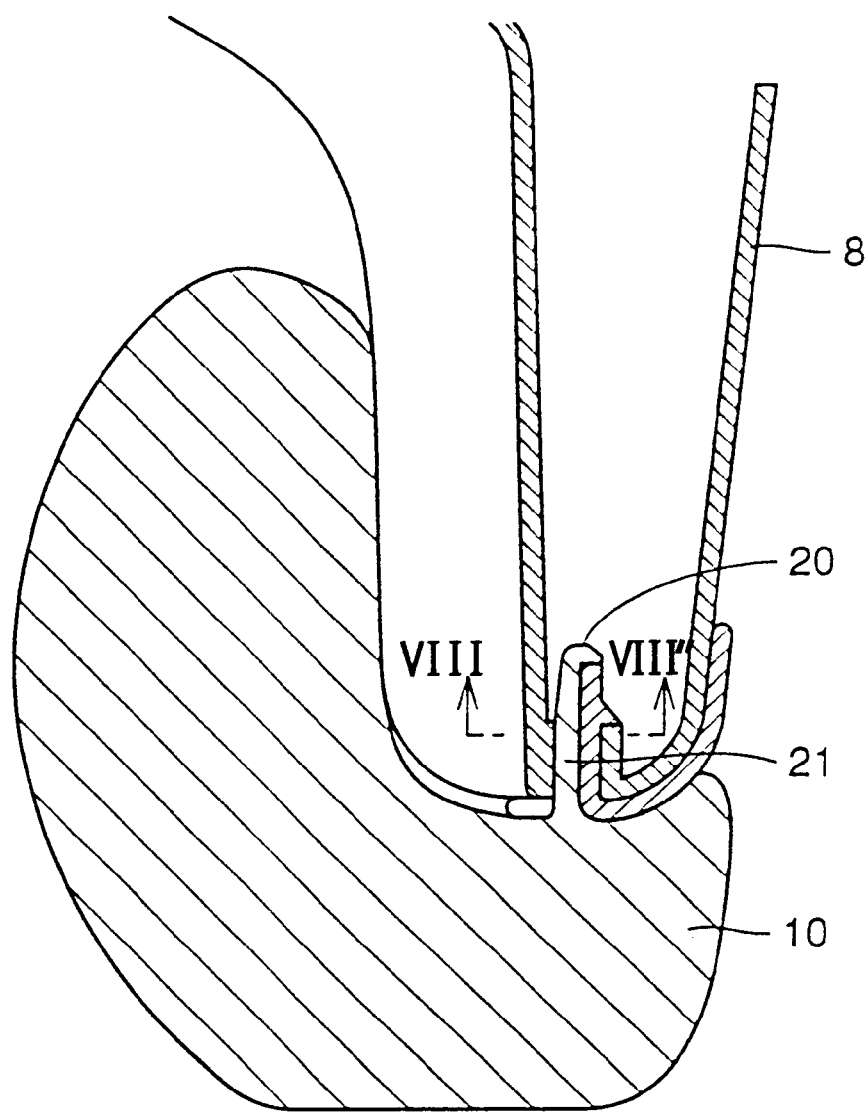
FIG. 6 is a partially enlarged cross sectional view showing a structure linking the side guard and the side head guards.

Here, side head guard 10 is formed such that a guide bar 21 provided on side head guard 10 is fit in a guide groove 20 provided in side guard 8 as shown in FIG. 6, so that the position of side head guard 10 can be adjusted as guide bar 21 slides along the guide grove 20.

Figure 7:
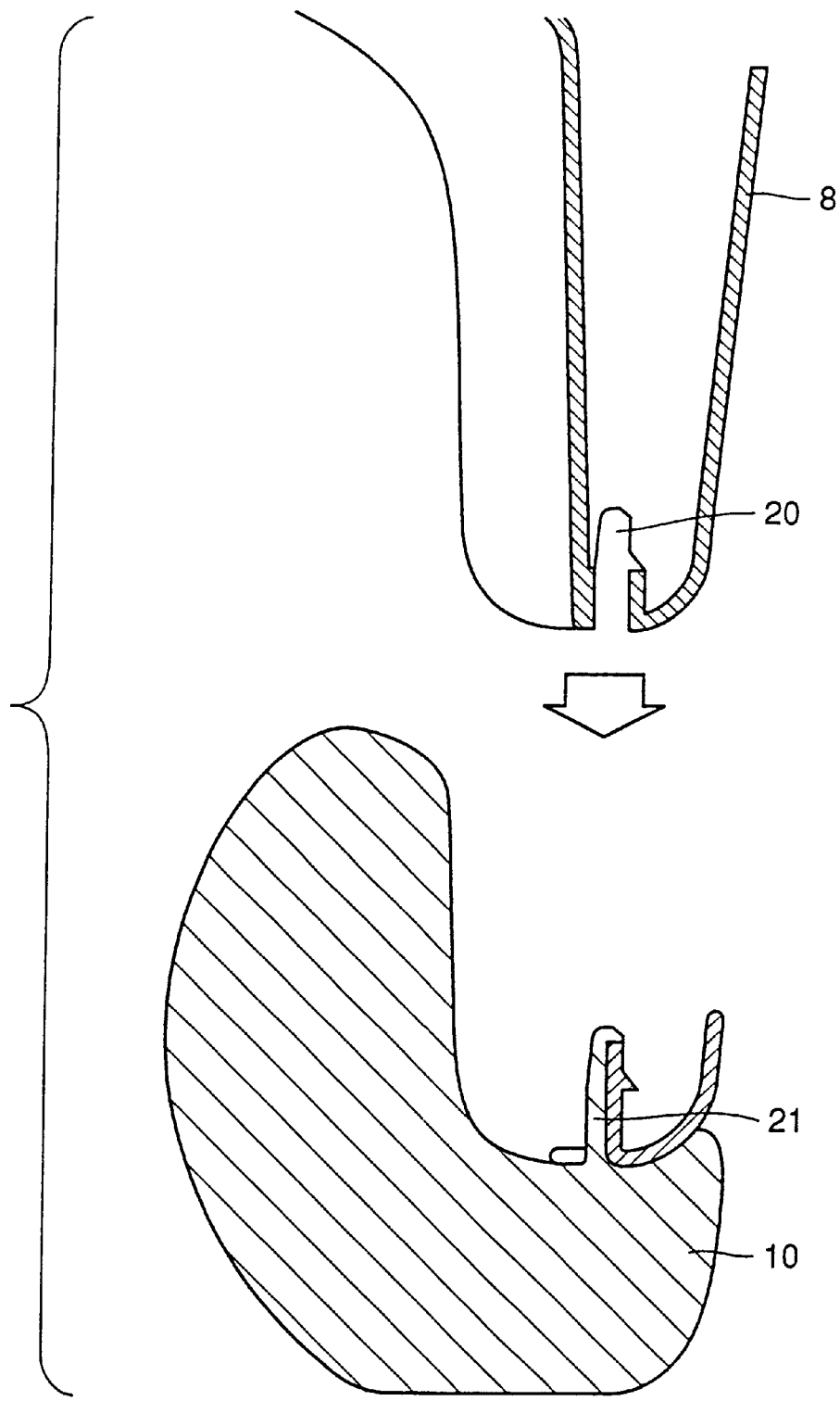
FIG. 7 is a partially enlarged cross sectional view showing the side guard with the side head guards removed.

As the infant 80 grows, the side head guard 10 may become unnecessary. For such a case, a structure allowing detachment of side head guard 10 from side guard 8 may be adopted, as shown in FIGS. 7 and 8.

Figure 8:
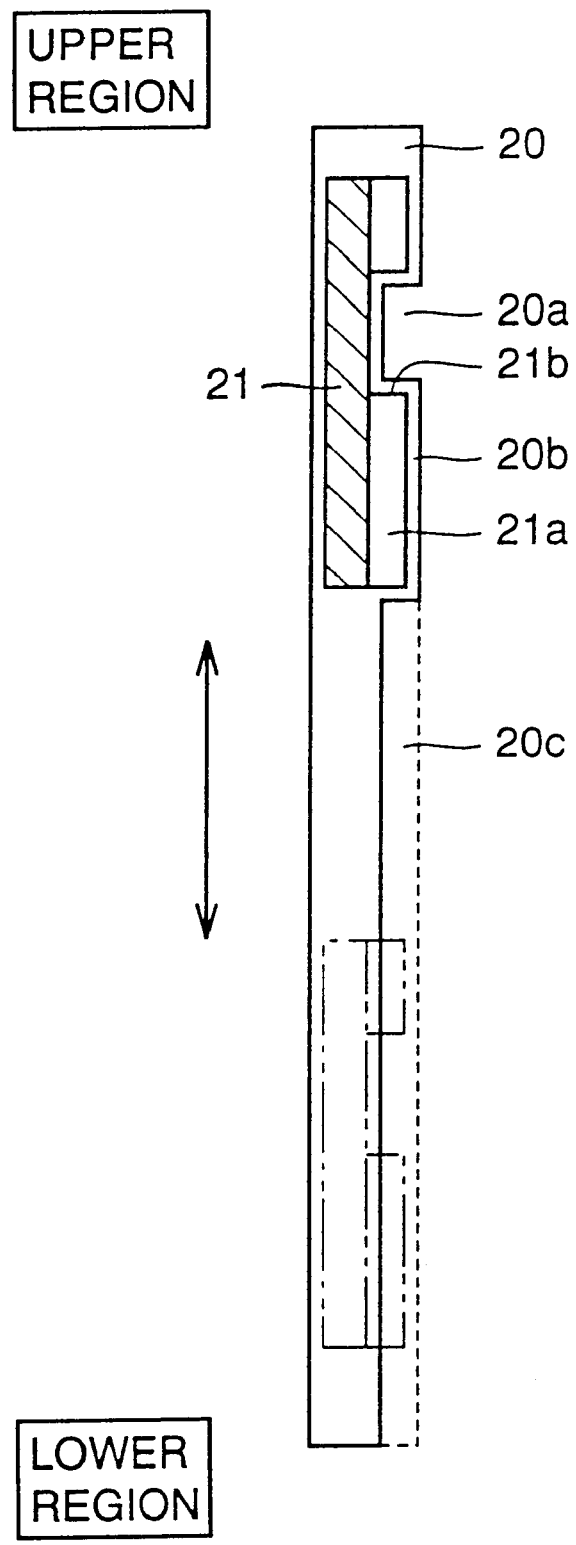
FIG. 8 is a cross section view taken along the line VIII–VIII' of FIG. 6.

FIG. 8 is a cross sectional view taken along the line VIII–VIII' in FIG. 6. As shown in FIG. 8, there is a region for pulling guide bar 21 out of guide groove 20 provided in the upper region of guide groove 20. In this region, guide groove 20 has a protruded portion 20a and a slit 20b and when the positions of a recessed portion 21b and a pawl portion 21a provided on guide bar 21 match the positions of protruded portion 20a and slit 20b, side head guard 10 can be detached from side guard 8 (in the direction perpendicularly to the sheet of the drawing).

In regions other than the upper region of guide groove 20, a stopper 20c provided on guide groove 20 abuts the pawl portion 21a of guide bar 21, and therefore side head guard 10 cannot be detached from side guard 8.

As the structure allows position adjustment and detachment of side head guard 10, child seat 100 provides a comfortable space fitting the body of infant 80 continuously as the infant grows to a toddler.

Attachment of side head guard 11 on side guard 9 is similar to that of side head guard 10. Therefore, detailed description thereof is not repeated.

It is possible to provide a shock absorbing structure in side head guards 10 and 11. The shock absorbing structure will be described with reference to FIGS. 9 to 14.

Figure 9:
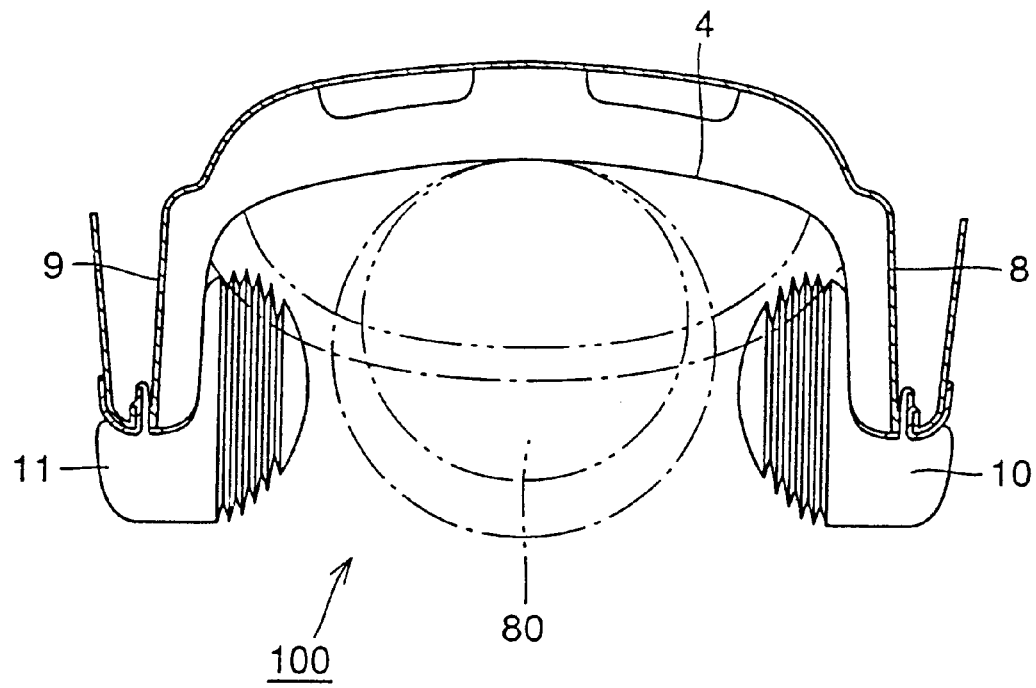
FIG. 9 is a cross sectional view of the child seat when a shock absorbing structure is adopted in the side head guards.
Figure 10:
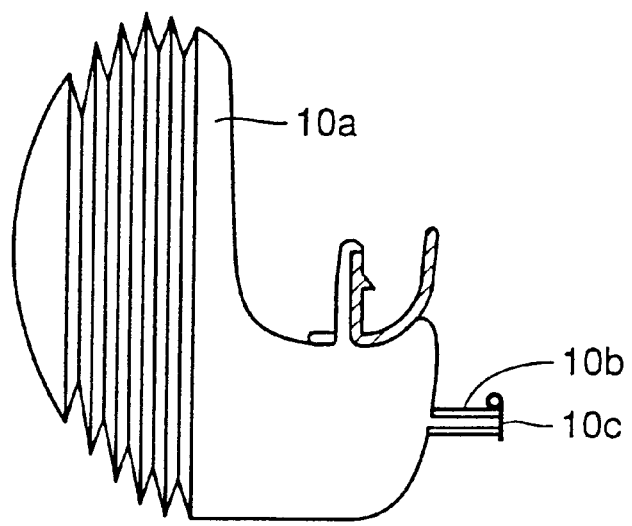
FIGS. 10 to 13 are first to fourth illustrations representing the side guard having the shock absorbing structure.

FIG. 9 shows a structure of child seat 100 in which side head guards 10 and 11 are provided with a shock absorbing structure, which corresponds to a cross section taken along the line III—III' of FIG. 1.

As side head guards 10 and 11 have the same structure, only side head guard 10 will be described with respect to the shock absorbing structure.

The shock absorbing structure used for side head guard 10 includes a body portion 10a having a space in which air is contained and an accordion structure on its surface; an outlet 10b for discharging the air in body portion 10a to the outside; and a spring valve 10c for opening/closing an opening of outlet 10b. The shape of body portion 10a is adapted such that capacity thereof is maximum in the normal state.

Figure 11:
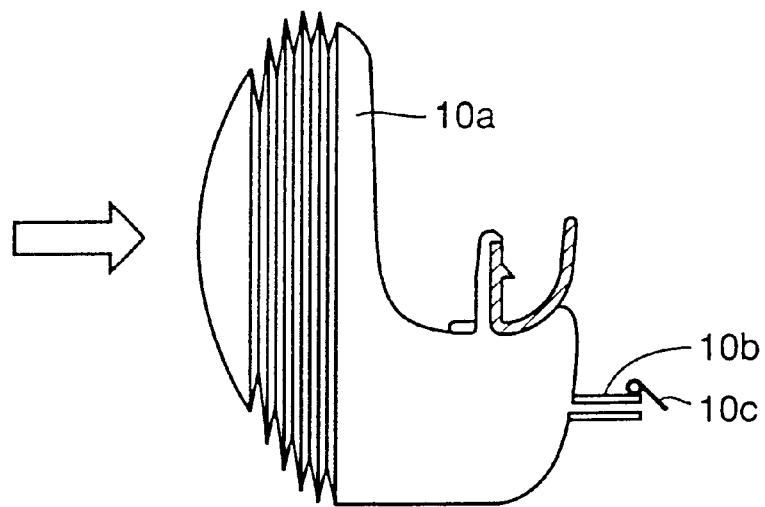

When there is a shock applied to body portion 10a (in the direction of the arrow in the figure), the air in body portion 10a is discharged to the outside against the spring force of spring valve 10c as shown in FIG. 11, and therefore the shock can be absorbed.

Further, after the air is discharged to the outside, pressure inside body portion 10a is negative as compared with the outside. Therefore, spring valve 10c is kept closed. When the body portion 10a is to be adjusted in size to be fitted to the body of infant 80, similar operation is performed.

Figure 12:
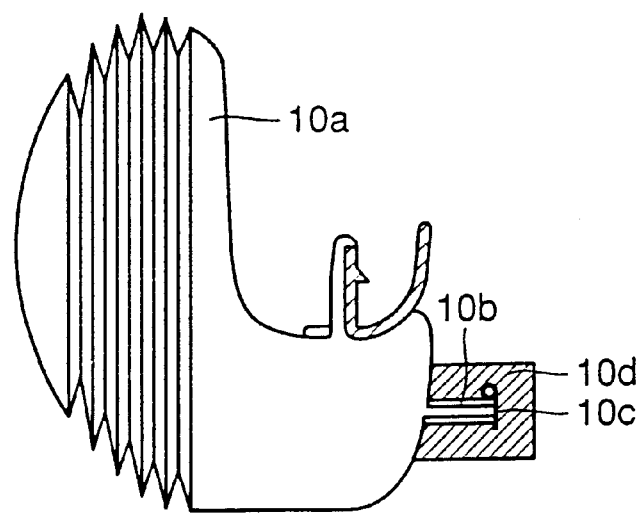
Figure 13:
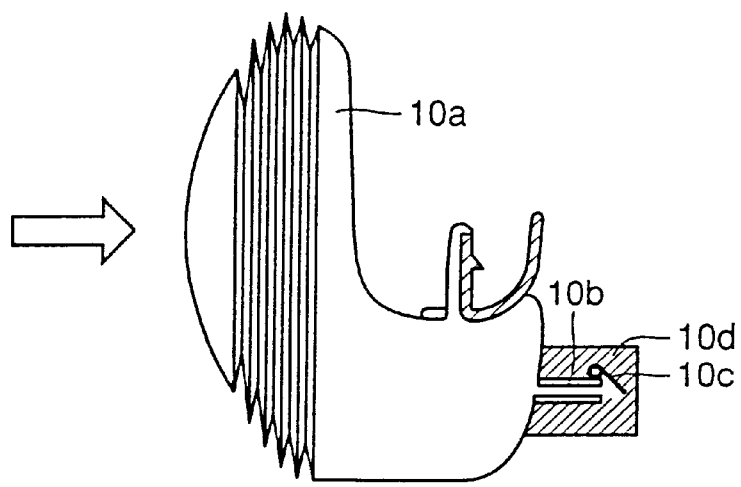

Further, the spring force of spring valve 10c may be adjusted by providing a cushioning material 10d formed of a sponge, for example, covering spring valve 10c as shown in FIGS. 12 and 13.

The shock absorbing structure is not limited to the one shown in FIGS. 9 to 13. For example, the shock absorbing structure disclosed in Japanese Patent Application No. 10-4750 filed on Jan. 13, 1998 (corresponding to U.S. application Ser. No. 09/229,516 filed on Jan. 13, 1999) by the same applicant as the present application may be adopted. An example of shock absorption is shown in FIG. 14.

Figure 14:
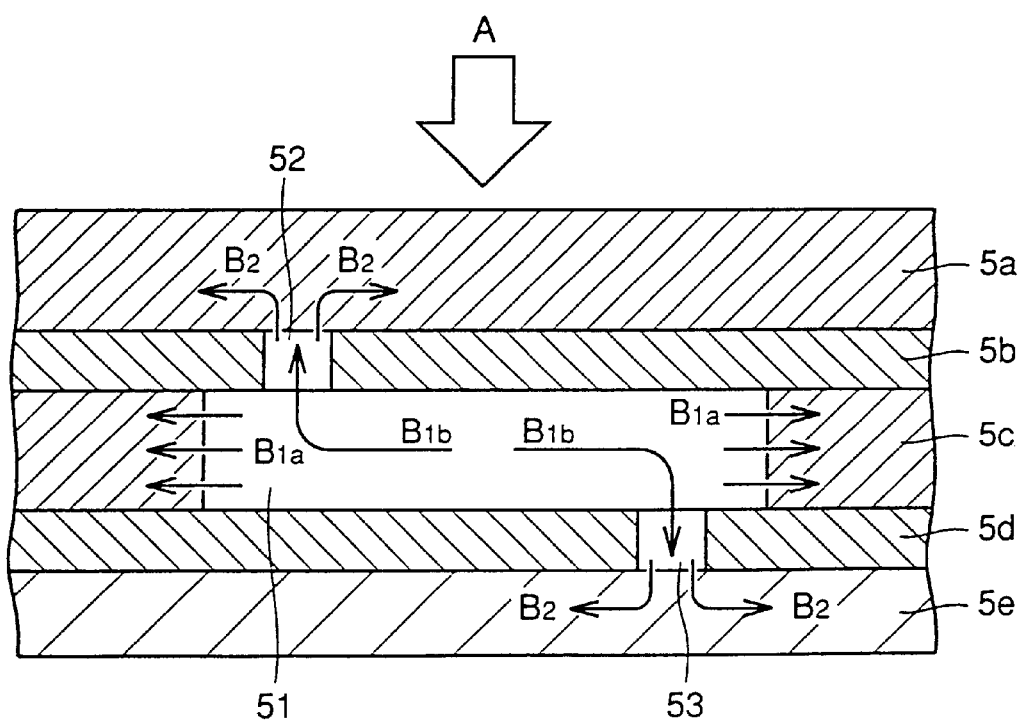
FIG. 14 is an illustration of the shock absorbing structure disclosed in Japanese Patent Application No. 10-4750.

The shock absorbing structure has a 5-layered cushion structure including first to fifth cushion layers 5a, 5b, 5c, 5d, and 5e as shown in FIG. 14. The third cushion layer 5c is sandwiched between the second and fourth cushion layers 5b and 5d and to space the third cushion layer 5c from the front and rear sides. The first and fifth cushion layers 5a and 5e sandwich the second and fourth cushion layers 5b and 5d therebetween.

Densities of members constituting the first, third and fifth cushion layers 5a, 5c and 5e are selected to be smaller than the densities of the members of the second and fourth cushion layers 5b and 5d. Further, the first, third and fifth cushion layers 5a, 5c and 5e are preferably softer than the second and fourth cushion layers 5b and 5d.

Thus, porous member of polyurethane foam is used for the first, third and fifth cushion layers 5a, 5c and 5e, while a porous member of polyethylene foam is used for the second and fourth cushion layers 5b and 5d.

Further, a plurality of air pools 51 consisting of prescribed spaces are provided at prescribed positions in the third cushion layer 5c, and outlet holes 52 and 53 communicated with the air pools 51 are provided in the second and fourth cushion layers 5b and 5d.

Here, outlet holes 52 and 53 are provided away from the center of air pool 51, and outlet holes 52 and 53 are also provided offset from each other. Outlet holes 52 and 53 are so arranged as to let out the air of air pool 51 not abruptly to the outside upon any shock but at a speed most efficient for absorbing the shock.

Because of this structure, when there is a shock from the outside (in the direction represented by the arrow A in FIG. 14), the shock is softened by the soft first and fifth cushion layers 5a and 5e. Thereafter, the shock is temporarily received by the hard second and fourth cushion layers 5b and 5d.

Then, by the shock applied to the second and fourth cushion layers 5b and 5d, the third cushion layer 5c is much compressed. At this time, air pool 51 provided in the third cushion layer 5c deforms considerably, so that the air in air pool 51 flows out to the inside of the third cushion layer 5c as represented by arrow B1a in the figure. The air B1b flowing out from outlet holes 52 and 53 flows out to soft first and fifth cushion layers 5a and 5e as represented by the arrow B2 in the figure.

As a result, the air from air pool 51 flows out through the inside of the third cushion layer 5c, outlet holes 52 and 53, and inside of the first and fifth cushion layers 5a and 5e, so that the shock is absorbed gradually. Accordingly, the shock can be absorbed efficiently with minimum speed. Preferably, a plurality of air pools 51 and a plurality of outlet holes 52 and 53 are provided at prescribed positions.

Second Embodiment

Figure 15:
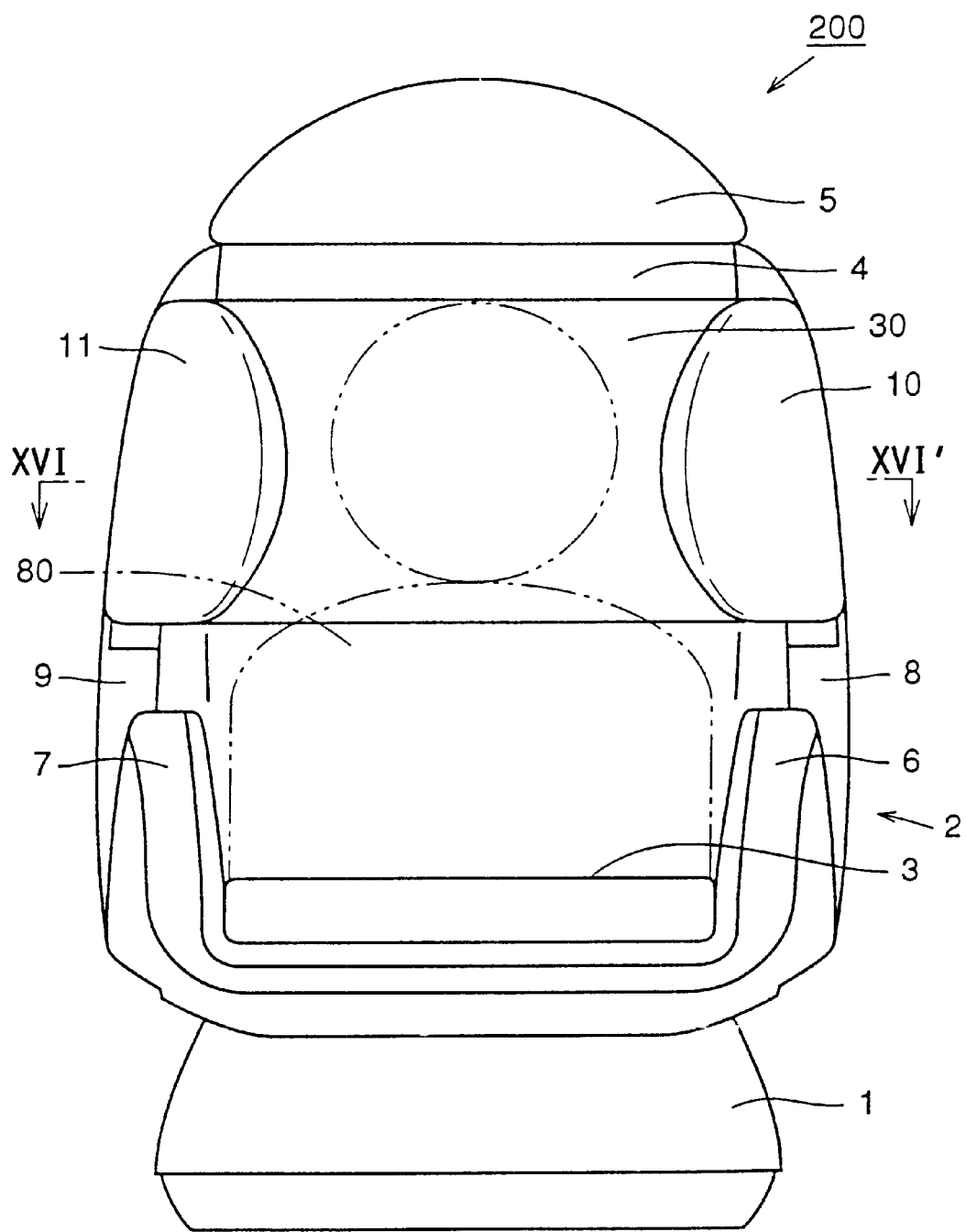
FIG. 15 is a front view showing a structure of a child seat in accordance with a second embodiment.

The structure of child seat 200 in accordance with the second embodiment will be described with reference to FIGS. 15 and 16. FIG. 15 is a front view of child seat 201 and FIG. 16 is a cross section taken along the line XVI–XVI' of FIG. 15.

In child seat 100 in accordance Keith the first embodiment described above, side portions of the head of infant 80 are protected both by side guards 8 and 9 and side head guards 10 and 11. However, the back side of the head of infant 80 is protected only by a single structure of back rest 4 or upper head guard 5.

Figure 16:
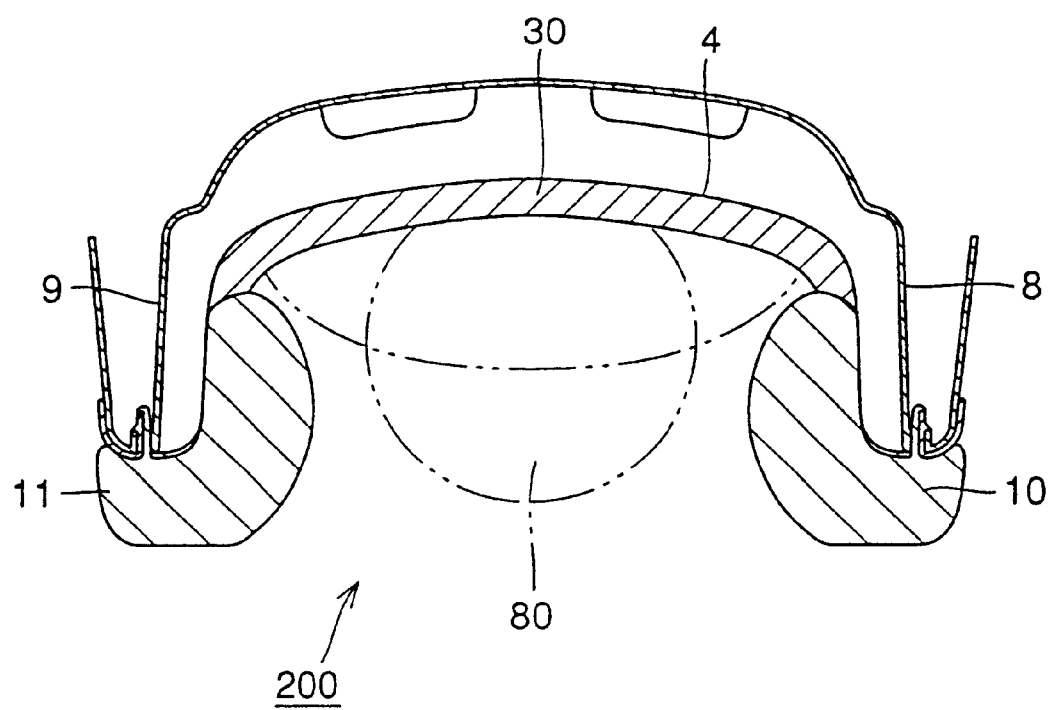
FIG. 16 is a cross sectional view taken along the line XVI–XVI' of FIG. 15.

Therefore, a strip shaped member 30 coupling back sides of side head guards 10 and 11 in front of back rest 4 is provided as shown in FIGS. 15 and 16, whereby double protecting structures including back rest 4 and strip shaped member 30 can be provided for protecting the back side of the head of infant 80.

Figure 17:
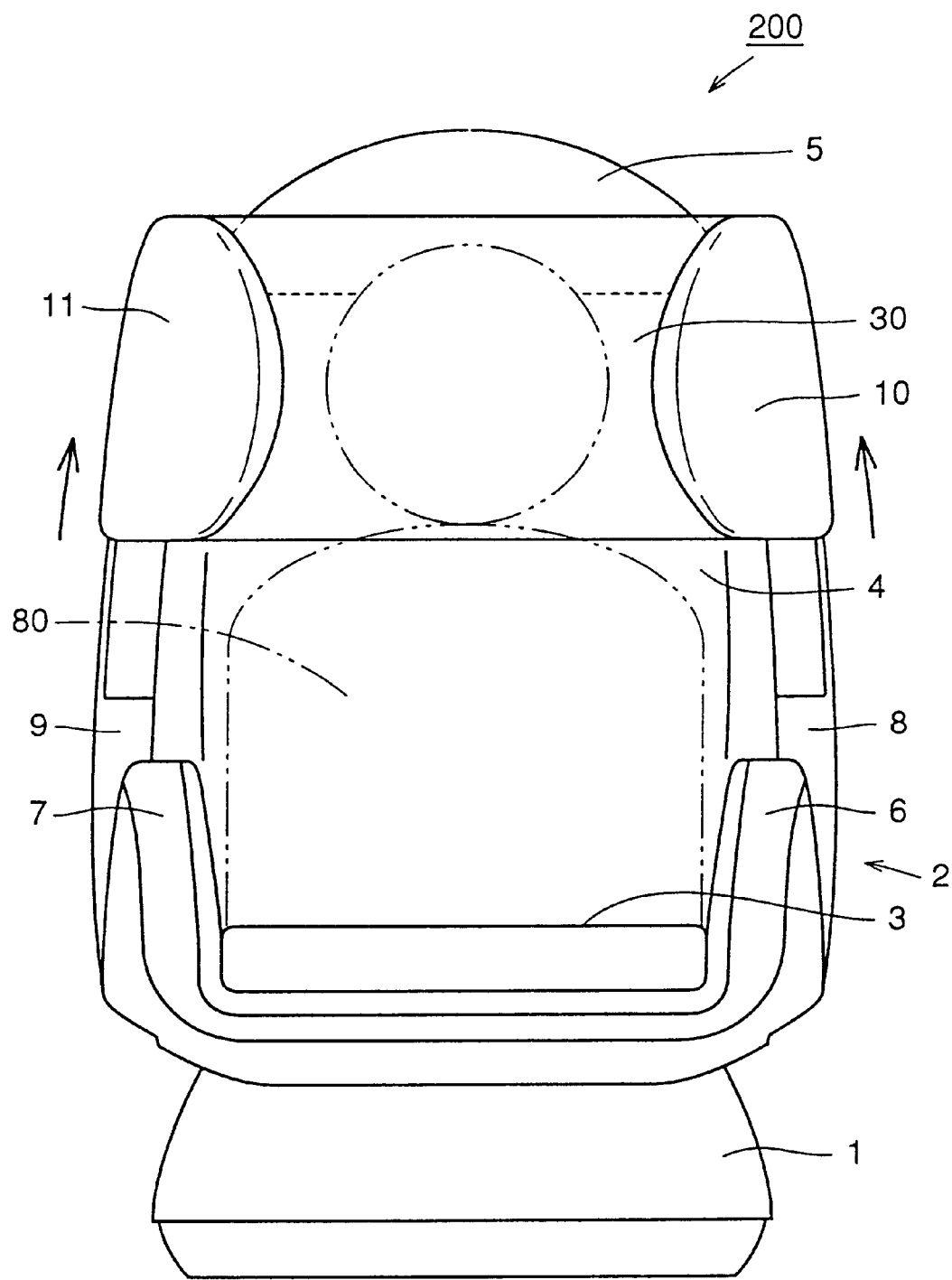
FIG. 17 is a front view of the child seat shown in FIG. 15 with its shape changed.

As a result, when side head guards 10 and 11 are moved upward to fit the body of infant 80 as shown in FIG. 17, strip shaped member 30 is also moved upward, and therefore the head of infant 80 can surely be protected.

Further, by including the shock absorbing structure as described above in strip shaped member 30, it is possible to further protect the side portions and the back portion of the head of infant 80 against shock.

Third Embodiment

Figure 18:
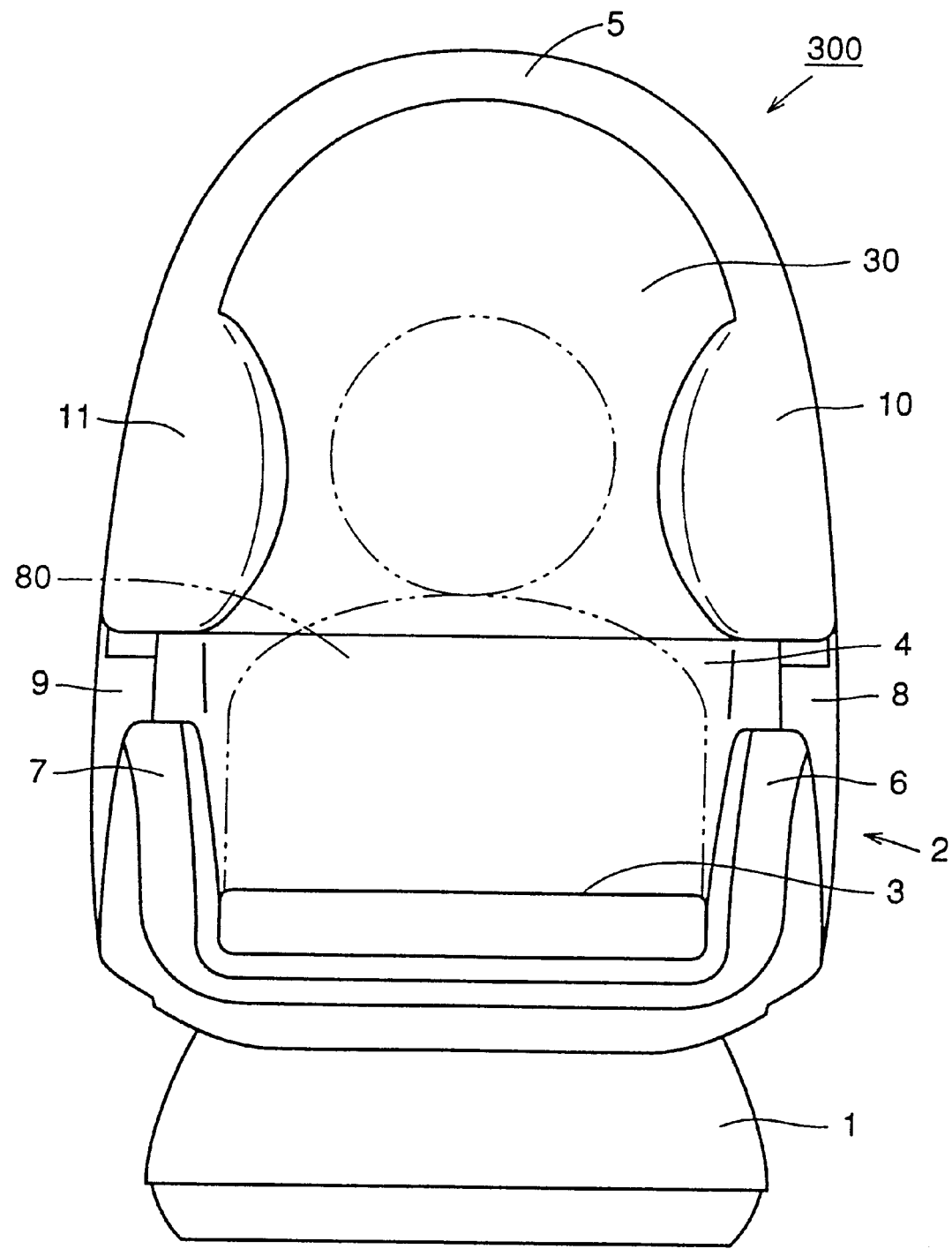
FIG. 18 is a front view showing a structure of a child seat in accordance with a third embodiment.
Figure 19:
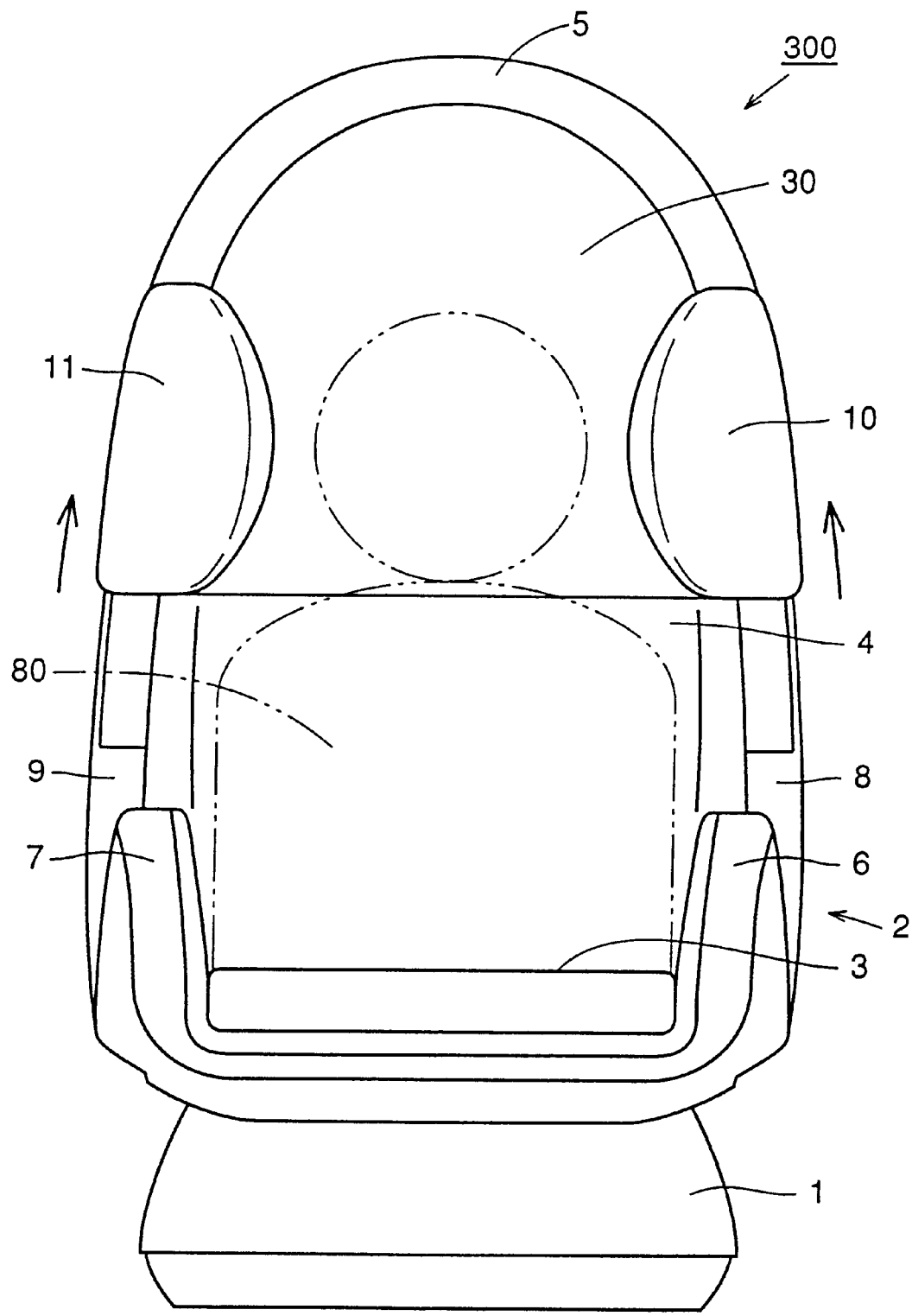
FIG. 19 is a front view of the child seat shown in FIG. 18 with its shape changed.

The structure of a child seat 300 in accordance with a third embodiment will be described with reference to FIGS. 18 and 19. FIG. 18 is a front view of child seat 300 in a first state, and FIG. 19 is a front view of child seat 300 in a second state.

In child seats 100 and 200 in accordance with the first and second embodiments, side head guards 10 and 11 and strip shaped member 30 can be adjusted in position to fit the body of infant 80. However, upper head guard 5 is fixed on back rest 4.

In child seat 300 in accordance with the present embodiment, side head guards 10 and 11, strip shaped member 30 and upper head guard 5 are structured integrally, allowing movement in upward direction.

By this structure, it becomes possible to move side head guards 10 and 11, strip shaped member 30 and upper head guard 5 integrally upward or downward to fit the body of infant 80. As a result, adjustment of child seat 300 to be fitted to the body of infant 80 is facilitated, and a comfortable space is always provided for infant 80.

Fourth Embodiment

Figure 20:
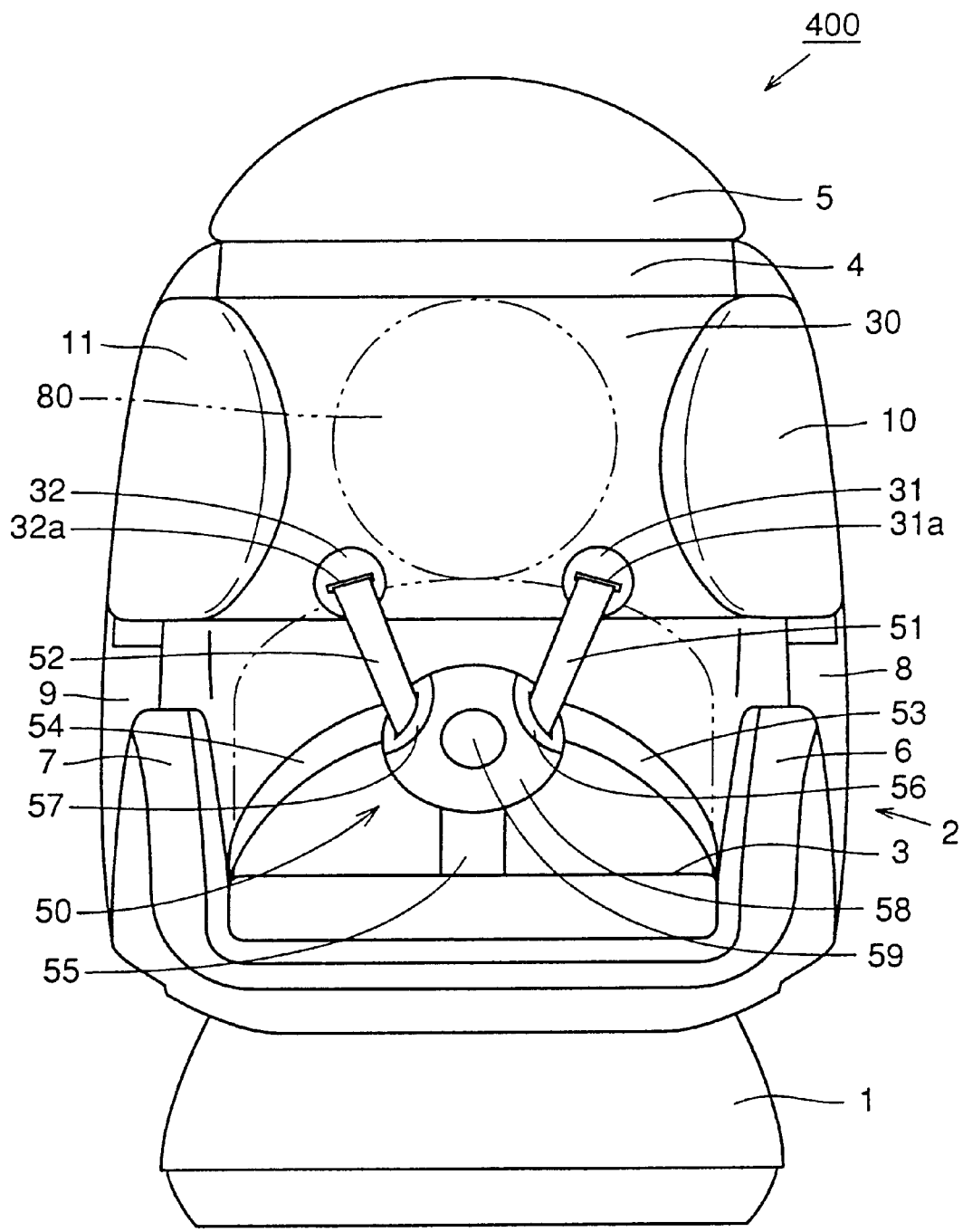
FIG. 20 is a front view showing the structure of the child seat in accordance with the fourth embodiment.
Figure 21:
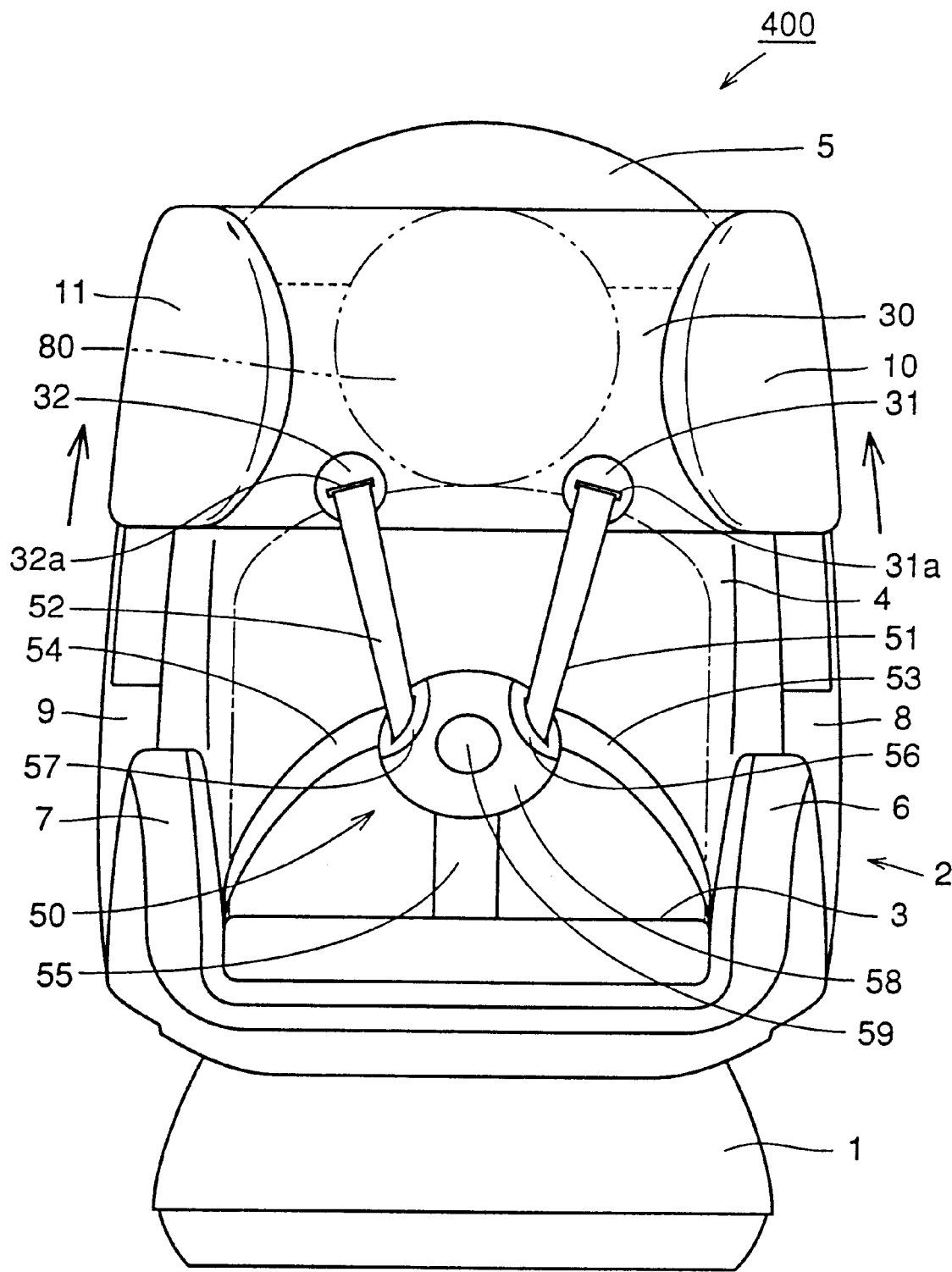
FIG. 21 is a front view of the child seat shown in FIG. 20 with its shape changed.

A structure of a child seat 400 in accordance with a fourth embodiment will be described with reference to FIGS. 20 and 21. FIG. 20 is a front view of child seat 400 in a first state and FIG. 21 is a front view of child seat 400 in a second state.

Generally, a child seat is provided with a safety belt 50 for supporting infant 80 as shown in FIG. 20. Safety belt 50 has shoulder belts 51 and 52 supporting shoulders of infant 80, and waist belts 53 and 54 supporting the waste of infant 80. There is a front belt 55 on which buckle 58 is attached, on seat 3.

Shoulder belts 51 and 52 and waist belts 53 and 54 are provided with tongue plates 56 and 57. With the tongue plates 56 and 57 fitted in buckle 58, infant 80 is surely supported on child seat 400. By operating a release button 59 of buckle 58, tongue plates 56 and 57 are released from buckle 58.

In the present embodiment, guide members 31 and 32 for holding shoulder belts 51 and 52 are provided on strip shaped member 30, and guide members 31 and 32 are provided with guide holes 31a and 32a through which shoulder belts 51 and 52 are passed.

By this structure, it becomes possible to adjust the position of strip shaped member 30 and to adjust positions to shoulder belts 51 and 52 of safety belt 50, to be fitted to the body of infant 80. As a result, adjustment of child seat 400 to be fitted to the body of infant 80 is facilitated, and a comfortable space is always provided for infant 80.

When the structure in accordance with the present embodiment is applied to the child seat in accordance with the second or third embodiment, adjustment of the child seat to be fitted to the body of infant 80 is further facilitated. For an improved structure, the strip shaped member 30 should preferably be provided in front of back rest 4. However, it may be provided behind back rest 4.

In the embodiments above, side head guards 10 and 11 are detachable from side body guards 8 and 9 and slidable in the upward and downward direction. It is not necessary that side head guards 10 and 11 are attached to side body guards 8 and 9. Any structure may be used provided that the side head guards 10 and 11 are positioned inside the side body guards 8 and 9. Further, position adjustment of side head guards 10 and 11 with respect to side body guards 8 and 9 are not limited to the slide structure described above. Any structure may be used provided that side head guards 10 and 11 can be attached at prescribed positions of side body guards 8 and 9.

Though a child seat has been described as an exemplary application of the nursing equipment in each of the above described embodiments, similar function and effects can be provided when the present structure is applied to a baby stroller, a baby chair, a baby bed and a baby belt as other nursing equipments Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child safety seat adapted for use on a vehicle seat, said child safety seat comprising an adjustable child safety device for supporting an infant, said adjustable child safety device comprising:

a backrest that has two opposite lateral sides and an upper end, said backrest being adapted for supporting a back of the infant;

a pair of side body guards that are individually arranged at and protruding from said two opposite lateral sides of said backrest, said side body guards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, each of said side head guards comprising a side head guard member and a guide bar protruding from its side head guard, each of said side body guards comprising a side body guard member and a guide groove in said side body guard member, wherein said guide bars of said side head guards are slidably received in a respective said guide groove for slidably and movably attaching said side head guards to said side body guards, and wherein each said guide bar includes a bar member and a pawl protruding from said bar member, wherein each said guide groove includes an overhanging stopper edge at a first end portion of said guide groove, said stopper edge overhanging and engaging said pawl for retaining said guide bar in said guide groove at said first end portion of said guide groove, said guide groove including an enlarged recessed opening at a second end portion of said guide groove opposite said first end portion, and wherein said enlarged recessed opening is adapted for allowing said pawl to pass therethrough so that said guide bar can be removed from said guide groove at said second end portion of said guide groove.

2. The child safety seat of claim 1, wherein said side head guards are detachable attached individually to said side body guards for a selective removal of said side head guards from said side body guards.

3. The child safety seat of claim 1, further comprising an upper head guard attached to said backrest at said upper end of said backrest, said upper head guard being positioned for protecting a top portion of the head of the infant, and wherein said side head guards are adapted to be removed from said side body guards independently of said upper head guard.

4. The child safety seat of claim 1, wherein said side head guards are slidably and movably attached to said side body guards respectively, so that side head guards are selectively slidable in said upward and downward direction along said side body guards between upper ends of said side body guards and lower ends of said side body guards.

5. The child safety seat of claim 4, wherein said side head guards are detachably attached individually to said side body guards for a selective removal of said side head guards from said side body guards.

6. The child safety seat of claim 4, wherein said second end portion of each guide groove is positioned at a respective said upper end of said side body guards and so that said side head guards are individually detachable from said upper end of said side body guards but not detachable from said lower end of said side body guards.

7. The child safety seat of claim 1, wherein at least a portion of said backrest constructed for contacting and supporting the back of the head of the infant comprises a shock absorbing structure.

8. The child safety seat of claim 1, further comprising an upper head guard directly attached to said upper end of said backrest.

9. The child safety seat of claim 1, further comprising a strip member interconnecting said side head guards.

10. A child safety seat adapted for use on a vehicle seat, said child safety seat comprising an adjustable child safety device for supporting an infant, said adjustable child safety device comprising:

a backrest that has two opposite lateral sides and an upper end, said backrest being adapted for supporting a back of the infant;

a pair of side body guards that are individually arranged at and protruding from said two opposite lateral sides of said backrest, said side bodyguards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, and wherein each of said side head guards comprises a shock absorbing structure including an air chamber in a respective said side head guard and an accordion pleated structure enclosing said air chamber.

11. The child safety seat of claim 10, wherein each of said shock absorbing structures further comprises a one-way spring valve and an air outlet passage leading from said air chamber to said one-way spring valve, wherein said one-way spring valve is adapted for allowing air to pass from said air chamber outwardly through said spring valve and to block air from flowing inwardly through said spring valve into said air chamber.

12. A child safety seat adapted for use on a vehicle seat, said child safety seat comprising an adjustable child safety device for supporting an infant, said adjustable child safety device comprising:

a backrest that has two opposite lateral sides and an upper end, said backrest being adapted for supporting a back of the infant;

a pair of side body guards that are individually arranged at and protruding from said two opposite lateral sides of said backrest, said side bodyguards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, wherein each of said side head guards comprises a shock absorbing multi-layered structure including a plurality of cushioning layers with outermost layers and an innermost layer having a relatively lower density, and further comprising intermediate layers between said innermost layer and said outermost layers, said intermediate layers having a relatively higher density compared to said lower density of said outermost and innermost layers.

13. The child safety seat of claim 12, wherein said shock absorbing multi-layered structure further comprises a plurality of air pools in respective hollow chambers in said innermost layer, and air outlet holes communicating said hollow chambers to the atmosphere.

14. The child safety seat of claim 12, wherein said outermost and innermost layers are polyurethane foam layers, and wherein said intermediate layers are polyethylene foam layers.

15. A child safety seat adapted for use on a vehicle seat, said child safety seat comprising an adjustable child safety device for supporting an infant, said adjustable child safety device comprising:

a backrest that has two opposite lateral sides and an upper end, and said backrest being adapted for supporting a back of the infant;

a pair of side body guards that are individually arranged at and protruding from said two opposite lateral sides of said backrest, said side bodyguards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, said child safety seat further comprising a strip-shaped member interconnecting said side head guards, and wherein said strip-shaped member has a guide hole, said child safety seat further comprising a safety belt including a shoulder belt passing through said guide hole for restraining the infant on said backrest.

16. The child safety seat of claim 15, further comprising a holding member arranged in said guide hole for holding said shoulder belt.

17. A child safety seat adapted for use on a vehicle seat, said child safety seat comprising an adjustable child safety device for supporting an infant, said adjustable child safety device comprising:

a backrest that has two opposite lateral sides and an upper end, said backrest being adapted for supporting a back of the infant;

a pair of side body guards that are individually arranged at and protruding from said two opposite lateral sides of said backrest, said side bodyguards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, said child safety seat further comprising a striping shaped member interconnecting said side head guards, wherein said strip-shaped member is arranged on a front side of said backrest facing toward the infant, and wherein said strip-shaped member includes a shock absorbing structure for supporting contact with the head of the infant.

18. A child safety seat adapted for use on a vehicle seat, said child safety seat comprising an adjustable child safety device for supporting an infant, said adjustable child safety device comprising:

a backrest that has two opposite lateral sides and an upper end, said backrest being adapted for supporting a back of the infant;

a pair of side body guards that are individually arranged at and protruding from said two opposite lateral sides of said backrest, said side bodyguards being adapted for protecting sides of the infant's body, a pair of side head guards individually arranged inwardly of said side body guards, means movably attaching said side head guards to said side body guards for adjustably moving each side head guard in an upward and downward direction, said side head guards being adapted for protecting sides of the infant's head, said child safety seat further comprising a strip-shaped member interconnecting said side head guards, said child safety seat further comprising an upper head guard connected to an upper portion of said strip-shaped member in a position for protecting the top portion of the head of the infant, wherein said side head guards, said upper head guard and said strip-shaped member are all together movable in said upward and downward direction relative to said backrest and to said side body guards.

* * * * *

UNITED STATES PATENT AND TRADEMARK OFFICE
CERTIFICATE OF CORRECTION

PATENT NO. : 6,485,101 B2
DATED : November 26, 2002
INVENTOR(S) : Kenzou Kassai and Hiroyasu Yamamoto It is certified that error appears in the above-identified patent and that said Letters Patent is hereby corrected as shown below:

Column 1,
Line 39, after "No.", replace "10-2550426" by -- 10-250426 --.

Signed and Sealed this

Twenty-sixth Day of August, 2003

JAMES E. ROGAN
*Director of the United States Patent and Trademark Office*